United States Patent
Ittycheriah et al.

(10) Patent No.: US 8,620,961 B2
(45) Date of Patent: Dec. 31, 2013

(54) MENTION-SYNCHRONOUS ENTITY TRACKING: SYSTEM AND METHOD FOR CHAINING MENTIONS

(75) Inventors: Abraham Ittycheriah, Brookfield, CT (US); Hongyan Jing, White Plains, NY (US); Nandakishore Kambhatla, White Plains, NY (US); Xiaoqiang Luo, Ardsley, NY (US); Salim E. Roukos, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 886 days.

(21) Appl. No.: 12/115,321

(22) Filed: May 5, 2008

(65) Prior Publication Data
US 2008/0243888 A1 Oct. 2, 2008

Related U.S. Application Data

(62) Division of application No. 10/833,256, filed on Apr. 27, 2004, now Pat. No. 7,398,274.

(51) Int. Cl.
G06F 7/00 (2006.01)
G06F 17/30 (2006.01)

(52) U.S. Cl.
USPC .......................................................... 707/797

(58) Field of Classification Search
USPC .......................................................... 707/797
See application file for complete search history.

(56) References Cited

U.S. PATENT DOCUMENTS

| | | | | |
|---|---|---|---|---|
| 5,621,859 A * | 4/1997 | Schwartz et al. | ............ | 704/256 |
| 5,822,730 A * | 10/1998 | Roth et al. | .................. | 704/255 |
| 6,006,181 A * | 12/1999 | Buhrke et al. | ............... | 704/231 |
| 6,272,455 B1 * | 8/2001 | Hoshen et al. | .................... | 704/1 |
| 6,275,801 B1 * | 8/2001 | Novak et al. | .................. | 704/252 |
| 6,523,201 B1 * | 2/2003 | De Michele | ...................... | 5/648 |
| 6,941,511 B1 * | 9/2005 | Hind et al. | ..................... | 715/235 |
| 7,400,712 B2 * | 7/2008 | August | ...................... | 379/88.01 |
| 2002/0023113 A1 * | 2/2002 | Hsing et al. | .................. | 707/513 |
| 2003/0120662 A1 * | 6/2003 | Vishik | .......................... | 707/100 |
| 2003/0158856 A1 * | 8/2003 | Nishigaya et al. | ........... | 707/102 |
| 2003/0172196 A1 * | 9/2003 | Hejlsberg et al. | ............ | 709/328 |
| 2003/0182282 A1 * | 9/2003 | Ripley | ............................ | 707/5 |
| 2003/0221169 A1 * | 11/2003 | Swett | ............................. | 715/514 |
| 2004/0031024 A1 * | 2/2004 | Fairweather | ................. | 717/143 |
| 2004/0044659 A1 * | 3/2004 | Judd et al. | ........................ | 707/3 |
| 2004/0083092 A1 * | 4/2004 | Valles | ............................ | 704/9 |
| 2004/0205711 A1 * | 10/2004 | Ishimitsu et al. | ............ | 717/116 |
| 2004/0230896 A1 * | 11/2004 | Elza et al. | ....................... | 715/511 |
| 2005/0060306 A1 * | 3/2005 | Hattori et al. | ..................... | 707/3 |
| 2005/0108630 A1 * | 5/2005 | Wasson et al. | ................ | 715/513 |

OTHER PUBLICATIONS

W3C, "DOM Level 2 Core Specification", Nov. 13, 2000, W3C, Version 1.0, Entire Specification.*

(Continued)

*Primary Examiner* — Rehana Perveen
*Assistant Examiner* — Huen Wong
(74) *Attorney, Agent, or Firm* — Frank Chau; Anne V. Dougherty, Esq.

(57) ABSTRACT

A Bell Tree data structure is provided to model the process of chaining the mentions, from one or more documents, into entities, tracking the entire process; where the data structure is used in an entity tracking process that produces multiple results ranked by a product of probability scores.

16 Claims, 9 Drawing Sheets

(a) Mention 1    (b) Mention 2    (c) Mention 3

(56) References Cited

OTHER PUBLICATIONS

W3C, "DOM Level 3 Core Specification", Apr. 7, 2004, W3C, Version 1.0, Entire Specification.*

W3C, "DOM Level 3 Core XPath Specification", Feb. 26, 2004, W3C, Version 1.0, Entire Specification.*

Haustein et al., "taDOM: A Tailored Synchronization Concept with Tunable Lock Granularity for the DOM API", 2003, University of Kaiserslautern.*

Ennser et al., "Integrating XML with DB2 XML Extender and DB2 Text Extender", Dec. 2000, Internation Business Machines Corporation.*

Bremer et al., "XQuery/IR: Integrating XML Document and Data Retrieval", 2002, University of California.*

Wang et al., "X-Diff: An Effective Change Detection Algorithm for XML Documents", 2003, University of Wisconsin.*

Luo et al., "A mention-synchronous coreference resolution algorithm based on the Bell tree", 2004, IBM.*

* cited by examiner (a) Mention 1  
211

(b) Mention 2  
212

(c) Mention 3  
213

(a)
Mention 1

(b)
Mention 2

(c)
Mention 3

MENTION-SYNCHRONOUS ENTITY TRACKING: SYSTEM AND METHOD FOR CHAINING MENTIONS

CROSS-REFERENCE TO RELATED APPLICATION

This is a Divisional application of U.S. patent application Ser. No. 10/833,256, filed Apr. 27, 2004 now U.S. Pat. No. 7,398,274, the disclosures of which are herein incorporated by reference in their entirety.

FEDERALLY SPONSORED RESEARCH

This invention was made with Government support under SPAWAR No. N66001-99-2-8916, awarded by the National Security Agency (NSA). The Government has certain rights to this invention.

BACKGROUND OF INVENTION

1. Technical Field

The present invention relates to the processing of verbal communications, and more particularly, to resolving the coreference resolution problem.

2. Discussion of the Related Art

A mention is an instance of a reference to an object found in one or more documents. Mentions have types, examples including: a person, an organization, or a location. The collection of mentions that refer to the same object forms an entity. The following is illustrative.

In the following paragraph, mentions are marked with square brackets. Mention types are identified by the labels after the left bracket "[". For example, "American Medical Association" is an "ORG(anization)"; "heir apparent" is a "PER(son)." The number following a mention type identifier is for the convenience of reference. An entity is identified by the string before "]". Note that "ORG-1", "ORG-2", and "ORG-3" form an entity "E1" since they all refer to the organization "American Medical Association". Similarly, "PER-1" and "PER-2" form another entity "E2" since both refer to the same person. Mention "PER-3" forms a single-mention entity "E3".

> The [ORG-1 American Medical Association E1] voted yesterday to install the [PER-1 heir apparent E2] as [ORG-2 its E1] [PER-2 president-elect E2], rejecting a strong, upstart challenge by a [PER-3 District doctor E3] who argued that the nation's largest physicians' [ORG-3 group E1] needs stronger ethics and new leadership.

In many natural language applications, there is a need to know, to what entity a mention refers. This is the coreference resolution problem, also known as entity tracking. It concerns correctly grouping (also known as chaining), the mentions from one or more text documents, whose types have been marked, into entities.

A typical approach to the problem is defining a mention-pair quantity, measuring how likely the two belong to the same entity, and clustering mentions into entities based on the mention-pair measure. A drawback of this approach is the disconnection between the mention-pair modeling and decisions in the clustering step. The mention-pair measure alone is not enough to decide whether a mention should be linked with an entity, proper thresholds are needed for the system to work. Other work tries to remedy this drawback with a graphical model, which predicts an entity outcome directly, given a document and its mentions. However, computing a score of entities from mentions in a single step suffers from the high complexity of the model, and consequently, it is very difficult to well train the model.

Machine learning-based systems typically train a model that computes a binary number indicating whether two mentions link or not (i.e., hard-decision), or a real number measuring how likely it is that a pair of mentions belong to an entity (i.e., soft-decision). Information used to compute this number may include spelling, distance, gender, number, and other linguistic knowledge (e.g., apposition) of the mention pair.

Once the model is trained, a system scans mentions in a document. For each mention the system tests all mentions preceding it, and the one resulting in the "best" score is picked as the antecedent of the current mention. If none of the candidate mentions is good enough, the current mention is not linked with any preceding mention. Note that an instant decision is made as to whether the current mention links with any candidate and no alternative is kept when searching for the best candidate. Therefore, these systems can generate only one result.

SUMMARY OF THE INVENTION

A system and method is provided for modeling the process of forming entities from mentions one step at a time for solving the coreference resolution problem. This is also known as entity tracking. The invention has the benefit of a simple mention-pair model, and yet has the property of finding the best entity outcome (also known herein as entity result or result) globally, instead of making locally sub-optimal decisions as done in a typical clustering approach. The mentions that are to be chained into entities can come from one or more documents, where documents can be any form of textual information.

An exemplary embodiment of the present invention includes a data storage device readable by machine, tangibly embodying a data structure comprising a tree structure indicative of chaining a plurality of mentions to at least one entity, the tree structure for selecting a preferable result in response to a query.

Another exemplary embodiment of the present invention includes data storage device as defined above, wherein the tree structure is a Bell Tree structure. Wherein, a Bell Tree structure comprises a plurality of layers, each layer being associated with a mention to be chained into a plurality of entities. Each layer of said plurality of layers having a set of nodes. Each node, of the set of nodes, having at least one partial entity and representing a unique result.

Another exemplary embodiment of the present invention includes a method for entity tracking, comprising selecting each of a plurality of mentions one at a time. Starting a new partial entity for the selected mention, and associating the new partial entity with each of all existing results, wherein all possible associations are represented in a new set of results. Linking the selected mention to each of a set of existing partial entities, wherein all possible results from linking are represented and added to the new set of results.

Another exemplary embodiment of the present invention includes the method for entity tracking as defined above used for system training.

Another exemplary embodiment of the present invention includes the method for entity tracking as defined above used for system testing.

Another exemplary embodiment of the present invention includes a program storage device readable by machine, tangibly embodying a program of instructions executable by the machine to perform method steps for entity tracking, the method steps comprising selecting each of a plurality of mentions one at a time. Starting a new partial entity for the selected mention and associating the new partial entity with each of all existing results, wherein all possible associations are represented in a new set of results. Linking the selected mention to each of a set of existing partial entities, wherein all possible results from linking are represented and added to the new set of results.

Another exemplary embodiment of the present invention includes the program storage device as defined above used for system training.

Another exemplary embodiment of the present invention includes the program storage device as defined above used for system testing.

DETAILED DESCRIPTION OF PREFERRED EMBODIMENTS

Exemplary embodiments of the present invention provide a Bell Tree structure to represent the process of forming entities from mentions. Exemplary embodiments of the present invention also provide an entity tracking process, which solves the coreference resolution problem. These exemplary embodiments generate multiple entity outcomes, an improvement over the single outcomes produced by the analogous art.

Figure 1:
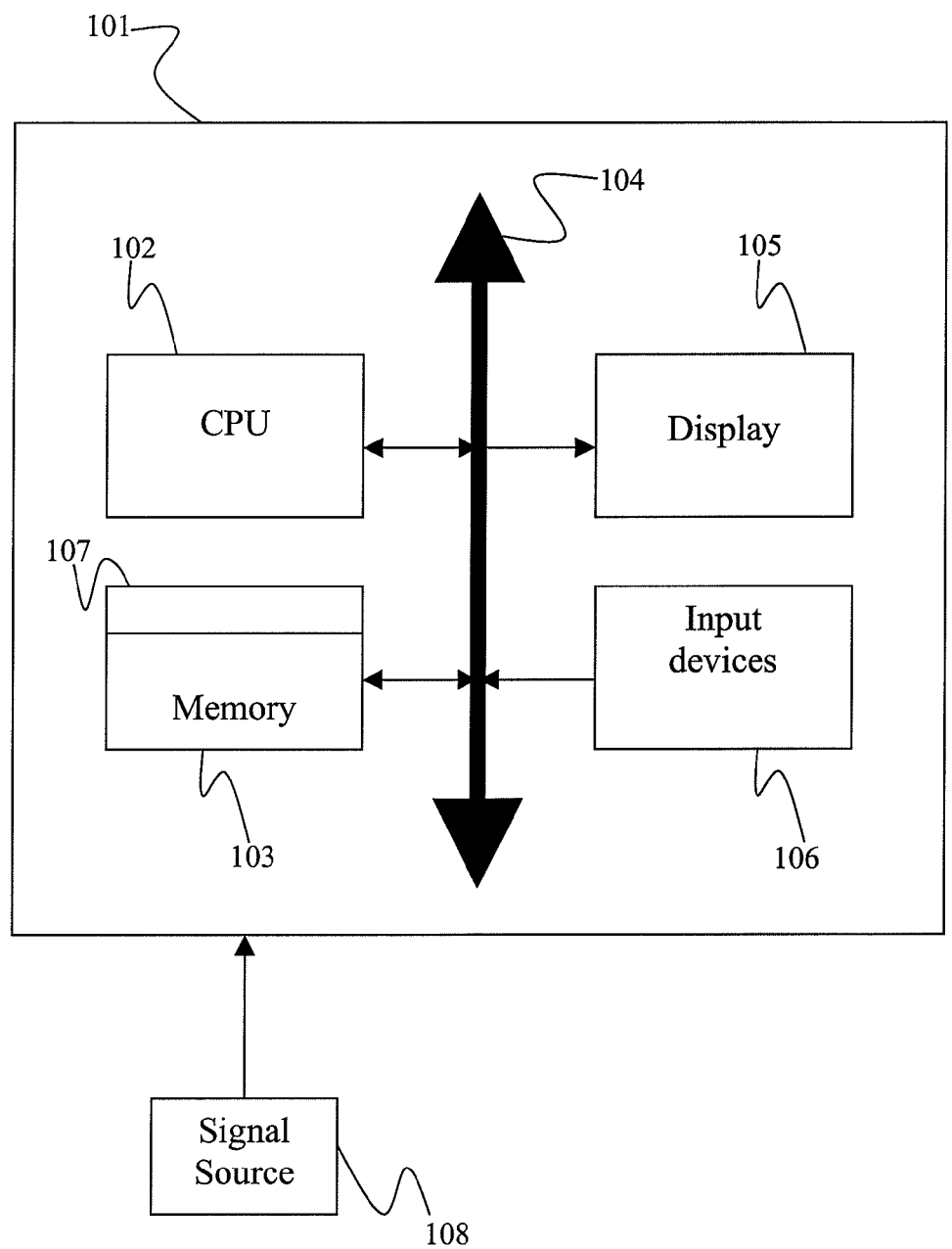
FIG. 1 is a schematic diagram illustrating an exemplary embodiment of a computer system.

Referring to FIG. 1, according to an exemplary embodiment of the present invention, a computer system 101 for implementing the present invention includes a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general-purpose computer system that becomes a specific purpose computer system when executing the routine 107 of the present invention.

The computer platform 101 also includes an operating system and microinstruction code. The various processes and functions described herein may either be part of the microinstruction code or part of the application program (or a combination thereof), which is executed via the operating system. In addition, various other peripheral devices may be connected to the computer platform, such as an additional data storage device and a printing device.

Figure 2:
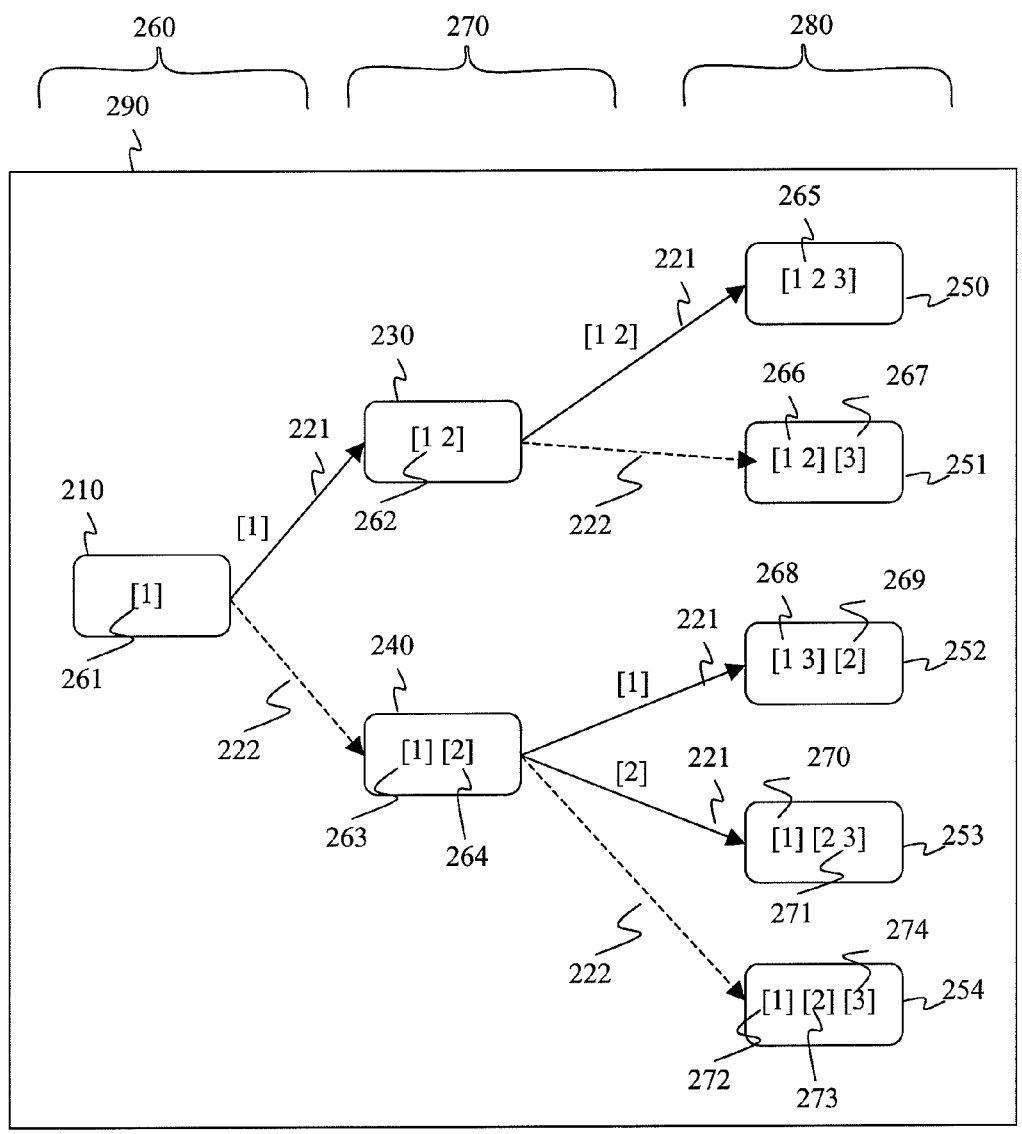
FIG. 2 is a schematic diagram illustrating an exemplary Bell Tree representation for three mentions.

Referring to FIG. 2, a tree structure 290 is used to represent the process of forming entities by chaining three mentions from one or more documents 211, 212, and 213, represented by the numbers '1', '2', '3'. This tree structure 290 is also known as a Bell Tree data structure (Bell Tree) 290. If more than three mentions are to be chained, the process described herein can be used, resulting in a larger Bell Tree data structure. The Bell Tree 290 is created with a number of similar nodes 210, 230, 240, and 250-254, with each node representing a different entity outcome. Numbers within "[ ]" denote partially-established entities, also known as partial entities, 261-274, wherein each enclosed number depicts a mention linked to that partial entity.

The first layer 260 contains the root node 210 of the Bell Tree 290. It represents the initial step of the chaining process, in which the first mention 211, represented by '1' in the figure, is used to start the first partial entity 261. Thus, the first layer 260 is associated with the adding of the first mention.

The second layer 270 represents all possible entity outcomes that occur when the second mention 212 is chained to the first mention 211. Mentions can be chained to each other by either linking to an existing partial entity, represented by solid arrows 221, or starting a new partial entity, and associating it with existing partial entities, represented by dashed arrows 222. As the second layer contains two nodes 230 and 240, two possible entity outcomes result from the chaining of the second mention 212, represented by '2' in the figure. Node 230 contains one partial entity 262 and represents the entity outcome of linking of the second mention 212 with the first partial entity 261. Node 240 contains two associated partial entities 263 and 264. It represents the entity outcome resulting from starting a new partial entity 264, with the second mention 212, and associating it with the first partial entity 261.

The third layer 280 represents all possible entity outcomes that occur when the third mention 213 is chained to the others. As the third layer contains five nodes 250-254, five possible entity outcomes can result from the chaining of the third mention 213, represented by '3' in the figure. Since the chaining of mentions is a cumulative process, each mention is chained to all the entity results that came immediately before it; thus, each layer of the Bell Tree builds on the preceding layer. In this case, the third layer 280 builds on the nodes 230 and 240 of the second layer 270. Node 250 contains only one partial entity 265, which is created by linking the third mention 213, to the single partial entity 262 in node 240. Node 251 contains two partial entities 266 and 267; here, the third mention 213 was used to start a new partial entity 267, which was then associated with the partial entity 262 in node 230. Node 252 contains two associated partial entities 268 and 269; here, the third mention 213 was linked to partial entity 263, in the preceding node 240, to create partial entity 268; partial entity 269 results from partial entity 264, in the preceding node 240, and remains unchanged in the entity outcome represented by node 252. Node 253 contains two associated partial entities 270 and 271; here, the third mention 213 was linked to partial entity 264, in the preceding node 240, to create partial entity 271; partial entity 270 results from partial entity 262, in the preceding node 240, and remains unchanged in the entity outcome represented by node 253. Node 254 contains three associated partial entities 272, 273, and 274; here a new partial entity 274 was started with the third mention 213, and then associated with the two partial entities 263 and 264, from node 240; partial entities 272 and 273 remain unchanged from partial entities 263 and 264, respectively. Thus, all possible entity outcomes (results) that occur, when the third mention 213 is chained to the others, are represented.

Additional mentions could be added to the Bell Tree in a similar manner. The tree is mention-synchronous, in that each layer of Bell Tree nodes is created by chaining one mention at a time. Thus, each layer of the Bell Tree is associated with the chaining of a specific mention.

Since in this case the third mention 213 is the last mention to be chained, layer 280 is also known as a leaf layer. The nodes that make up the leaf layer, in this case nodes 250-254, are also known as leaves. The partial entities 265-274, which make up the leaf nodes, are now known as entities. Thus, each leaf node represents one possible entity outcome, resulting from the chaining of all mentions, from one or more documents. Each result represents one possible chaining of mentions into entities. Since the number of tree leaves, is the number of possible entity outcomes and it equals the Bell Number, the tree is called a Bell Tree. The process of chaining mentions into entities is modeled in the Bell Tree; thus, the Bell Tree represents the search space of the coreference resolution problem. The coreference resolution problem now becomes finding the "best" leaf node.

Figure 3:
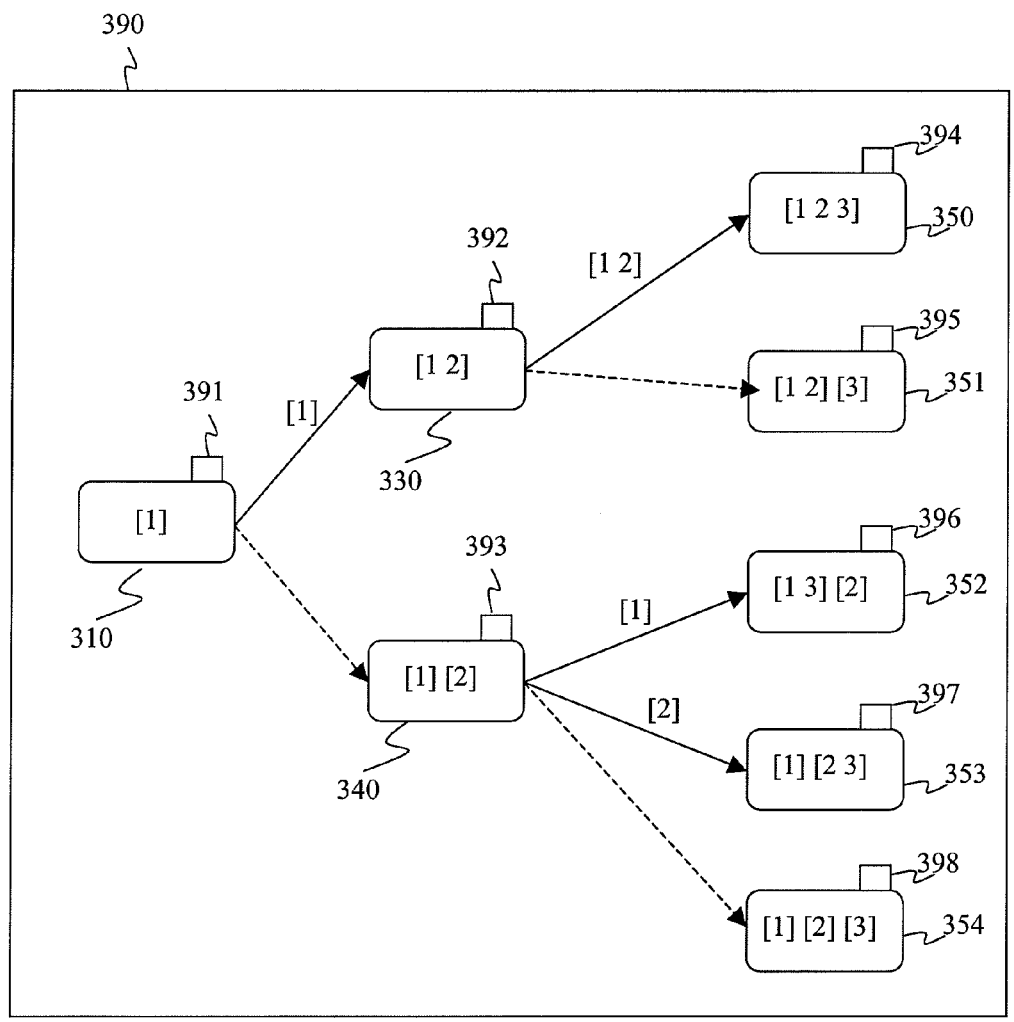
FIG. 3 is a schematic diagram illustrating an exemplary Bell Tree representation for three mentions, with associated scores.

Referring to FIG. 3, a modified Bell Tree data structure 390 is depicted. The Bell Tree structure 390 has been modified from the Bell Tree structure 290 to include a storage device 391-398 for storing node scores. Each node 310-354, is associated with its own score storage device 391-398, which stores the score assigned to the associated node.

An exemplary embodiment of an entity tracking algorithm can be described as follows:

Formally, let $\{m_i: 1 \le i \le n\}$ be n mentions for which we want to group into entities. Let $g: i \mapsto j$ be the map from mention index i to entity index j. For a mention index $k(1 \le k \le n)$, let us define $$J_k = \{t : t = g(i), \text{ for some } 1 \le i \le k-1\}, \quad (1)$$

the set of indices of the partially-established entities to the left of $m_k$ (note that $J_1 = \emptyset$), and $$E_k = \{e_t : t \in J_k\}, \quad (2)$$

the set of the partially established entities.

Given that $E_k$ has been formed to the left of the active mention $m_k$, $m_k$ can take two possible actions: if $g(k) \in J_k$, then the active mention $m_k$ is said to link with the partial entity $e_{g(k)}$); otherwise it starts a new partial entity $e_{g(k)}$. At training time, the action is known to us, and at testing time, both hypotheses will be kept during search. Notice that a sequence of such actions corresponds uniquely to an entity outcome (or a grouping of mentions into entities). Therefore, the problem of coreference resolution is equivalent to ranking the action sequences.

A binary model $P(L=1|E_k, m_k, A=t)$ is used to compute the link probability, where $t \in J_k$, L is 1 if and only if (iff) $m_k$ links with $e_t$; the random variable A is the index of the partial entity to which $m_k$ is linking. Since starting a new partial entity means that $m_k$ does not link with any partial entities in $E_k$, the probability of starting a new partial entity, $P(L=0|E_k, m_k)$, can be computed as $$P(L=0 \mid E_k, m_k) = \sum_{t \in J_k} P(L=0, A=t \mid E_k, m_k) = \quad (3)$$

$$1 - \sum_{t \in J_k} P(A=t \mid E_k, m_k) P(L=1 \mid E_k, m_k, A=t)$$

Equation 3 states that the probability of starting a partial entity can be computed using the linking probabilities $P(L=1|E_k, m_k, A=t)$, provided that the marginal $P(A=t|E_k, m_k)$ is known. $P(A=t|E_k, m_k)$ is approximated as:

$$P(A=t \mid E_k, m_k) = \begin{cases} 1 & \text{if } t = \text{argmax}_{i \in J_k} \\ & P(L=1 \mid E_k, m_k, A=i) \\ 0 & \text{otherwise} \end{cases} \quad (4)$$

That is, the starting probability is just one minus the maximum linking probability.

Training directly the model, $P(L=1|E_k, m_k, A=i)$, is difficult since it depends on all partial entities $E_k$. As a first attempt of modeling the process from mentions to entities, we make the following modeling assumptions:

$$P(L=1 \mid E_k, m_k, A=i) \approx P(L=1 \mid e_i, m_k) \quad (5)$$

$$\approx \max_{m \in e_i} P(L=1 \mid m, m_k) \quad (6)$$

Once the linking probability $P(L=1|E_k, m_k, A=i)$ is available, the starting probability $P(L=0|E_k, m_k)$ can be computed using Equations 3 and 4. A beam search algorithm, well known in the art, has been adapted for use in finding the best set of entities, a preferred embodiment of which is shown in Table 1.

TABLE 1

A Preferred Embodiment of a Coreference Decoding Algorithm

Input: mentions in text M={$m_i$: i=1, ...,n};
　　The desired number of results: N
Output: top N entity results
1:　　H ← {E₀= {{m₁}}}; scr(E₀) = 1
2:　　foreach k = 2, ...,n
3:　　　　H' ← ∅
4:　　　　foreach E ∈ H
5:　　　　　　E' ← E ∪ {{m_k}}
6:　　　　　　scr(E') ← scr(E) · P(L=0\E,m_k)
7:　　　　　　H' ← H' ∪ {E'}
8:　　　　　　foreach i ∈ J_k
9:　　　　　　　　E' ← (E\{e_i}) ∪ {e_i ∪ {m_k}}
10:　　　　　　　scr(E') ← scr(E) · P(L = 1\E_k, m_k, A = i)
11:　　　　　　　H' ← H' ∪ {E'}
12:　　　　H ← prune{H'}
13:　　return {E_(1), E_(2),..., E_(N)}

In Table 1, H contains all the hypothesized results, and line 1 initializes it with mention $m_1$ being a partial entity. Line 2 to 12 cycles through the remaining mentions: $m_2$ to $m_n$, and for each mention, the algorithm extends each result E in H by either starting and associating a new partial entity (line 4 to 7), or linking the mention with one of the partial entities in E (line 8 to 11). Variable scr(E) stores the cumulative score for E. The function prune (h) discards hypothesis whose scores fall below a threshold. The last line returns top N entity outcomes, where $E_{(r)}$ denotes the $r^{th}$ result ranked by scr(·). These steps are further described in FIG. 4-10. Entity outcomes can also be referred to as results.

A maximum entropy model is used to implement Equation 6. A maximum entropy model is well known, an example is shown in, "A maximum entropy approach to natural language processing", by Berger et. al., appearing in Conceptual Linguistics, 22(1):39-71, March 1996. Atomic features used by the model include:

string match—whether or not the mention strings of and are exactly match, or partially match;
context—surrounding words or part-of-speech tags (if available) of mentions m, $m_k$;
mention count—how many times a mention string appears in the document. The count is quantized;
distance—distance between the two mentions in words and sentences. This number is also quantized;
editing distance—quantized editing distance between the two mentions;
mention information—spellings of the two mentions and other information (such as POS tags) if available; If a mention is a pronoun, the feature also computes gender, plurality, possessiveness and reflexiveness;
acronym—whether or not one mention is the acronym of the other mention;
syntactic features—whether or not the two mentions appear in apposition. This information is extracted from a parse tree, and can be computed only when a parser is available;

Another category of features is created by taking a conjunction of the atomic features. For example, the model can capture how far a pronoun mention is from a named mention, when the distance feature is used in conjunction with mention information feature.

Figure 4:
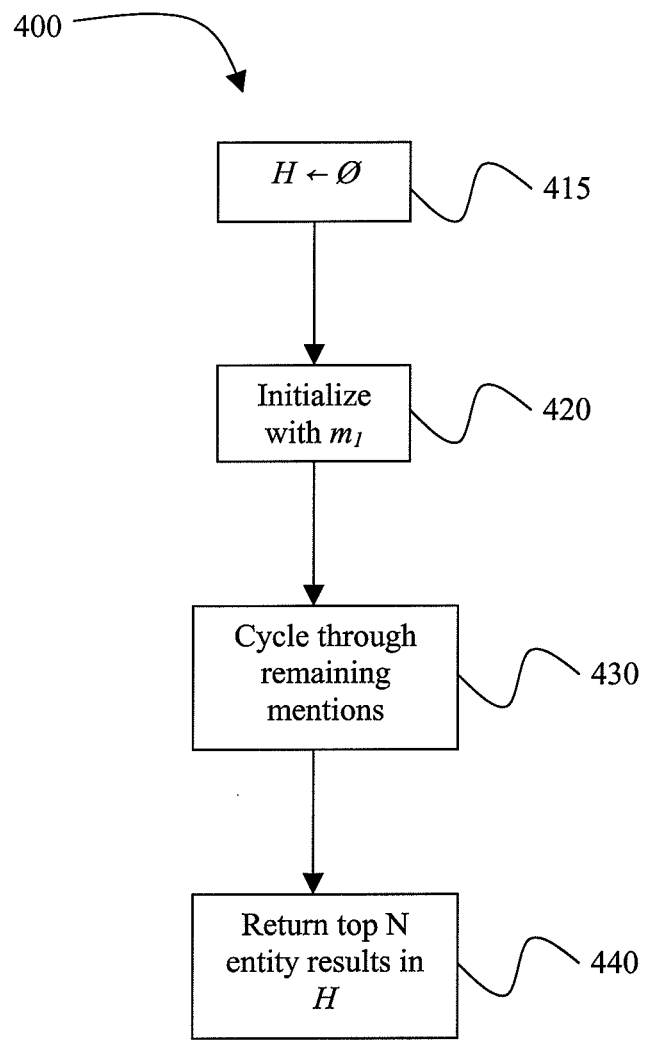
FIG. 4 is a flow diagram illustrating an exemplary Coreference Decoding Algorithm in accordance with the present invention.

FIG. 4 is a flow diagram that conveys an overview of the steps of a Coreference Decoding Algorithm, indicated generally by the reference numeral 400. Block 415 is the emptying of the hypothesized result storage device H. H is a form of the Bell Tree data structure described herein, and will be used to store all the incremental and final results. Block 420 initializes H with a first result, created with mention $m_1$. Block 430 cycles through the remaining mentions, creating a new set of results with each mention. Block 440 returns the top N results that are stored in H.

Figure 5:
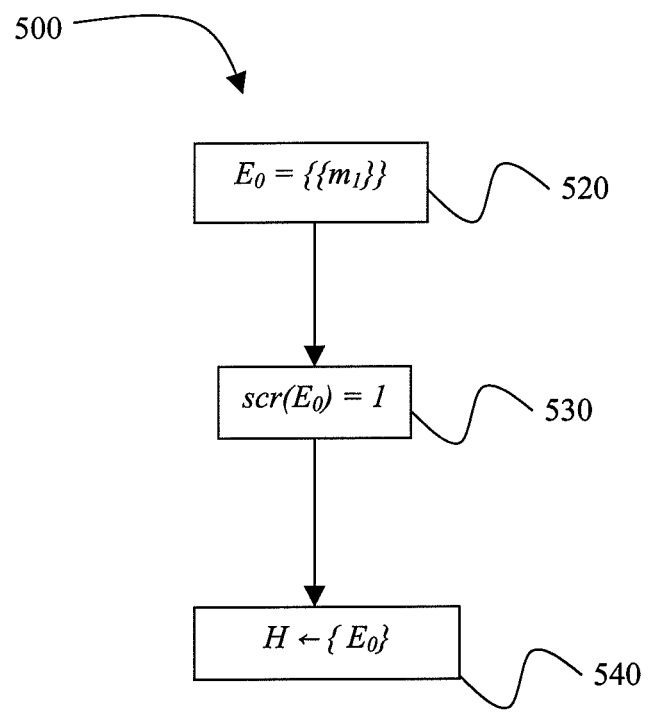
FIG. 5 is a flow diagram illustrating an exemplary "Initialize with $m_1$" Block in accordance with FIG. 4.

FIG. 5 depicts a flow diagram of the preferred embodiment of Block 420 from FIG. 4, "Initialize with $m_1$", indicated generally by the reference numeral 500. In Block 520, an entity is created with mention $m_1$ and stored in result $E_0$. Block 530 depicts the step of assigning a score of 1 to the result $E_0$. Block 540 stores the result $E_0$ as the first result in H. This is the root entity result 210 depicted in FIG. 2.

Figures 6, 7:
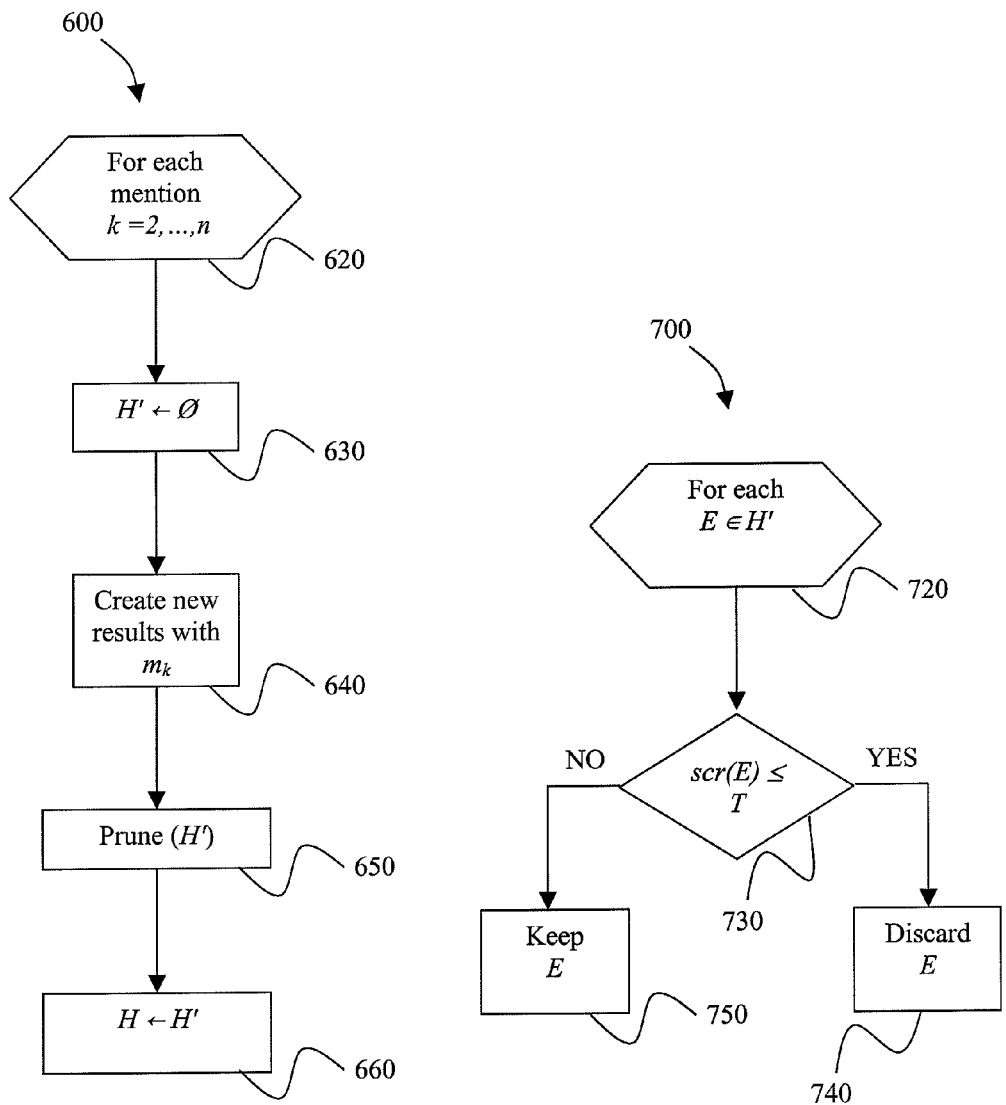
FIG. 6 is a flow diagram illustrating an exemplary "Cycle through remaining mentions" Block in accordance with FIG. 4.
FIG. 7 is a flow diagram illustrating an exemplary "Prune (H')" Block in accordance with FIG. 6.

FIG. 6 depicts a flow diagram of the preferred embodiment of Block 430 from FIG. 4, "Cycle through remaining mentions", indicated generally by the reference numeral 600. A looping block 620 executes a loop for each of the remaining mentions, selecting the mention one at a time. Each iteration of the loop creates a new set of results for the selected mention; thus, creating a new layer in the Bell Tree data structure shown in FIG. 2. Block 630 initializes a temporary hypothesized result storage device, H', to be empty. Block 640, "Create new results with $m_k$", creates a new set of results for the selected mention $m_k$. This set of results is stored in H' for further processing. Block 650 prunes the results that are most likely to be incorrect, from H'. This step keeps the H from becoming too large to be processed effectively. Block 660 stores the pruned set of results in H.

FIG. 7 depicts a flow diagram of the preferred embodiment of Block 650 from FIG. 6, the "Prune" function, indicated generally by the reference numeral 700. A looping Block 720 executes a loop for each result stored in H', selecting the result one at a time. Blocks 730, 740, and 750 depict how the selected result is processed. Each selected result's score is compared to a predetermined threshold, 'T'. If the score is less than or equal to the threshold, 'T', the entity is discarded, otherwise it is kept.

Figure 8:
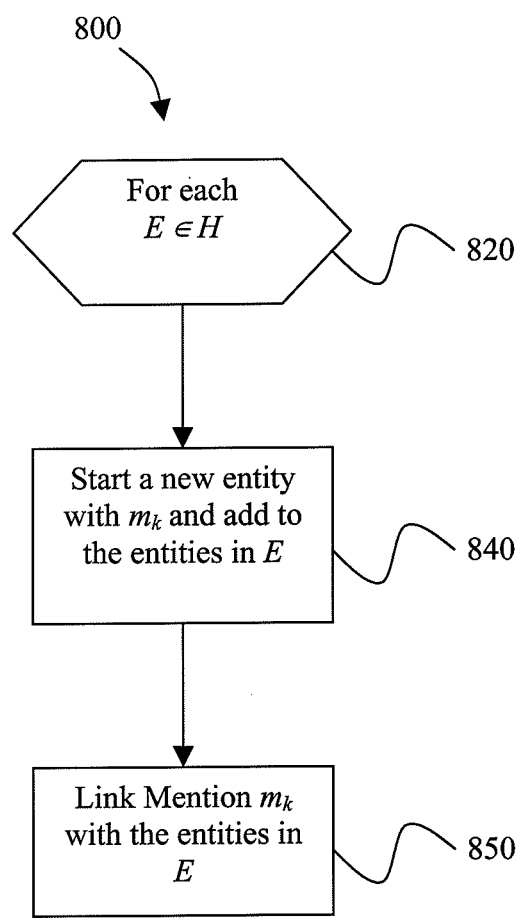
FIG. 8 is a flow diagram illustrating an exemplary "Create new results with $m_k$" Block in accordance with FIG. 6.

FIG. 8 depicts a flow diagram of the preferred embodiment of Block 640 from FIG. 6, "Creating a new results with $m_k$", indicated generally by the reference numeral 800. These steps only apply if the selected mention $m_k$, is a mention other than the first mention of a set. A looping Block 820 executes a loop for the results stored in the leaf layer of H, selecting each result one at a time. During each iteration a new set of results is created, which represent every possible combination of the selected mention $m_k$ and the selected result. Block 840 creates a new result by starting a new partial entity with $m_k$, and associating it to the partial entities, already in the selected result. The steps of this process are further described in FIG. 9. Block 850 creates a set of new results, by linking the selected mention $m_k$, to each of the partial entities that make up the selected result. This process is described in FIG. 10.

Figure 9:
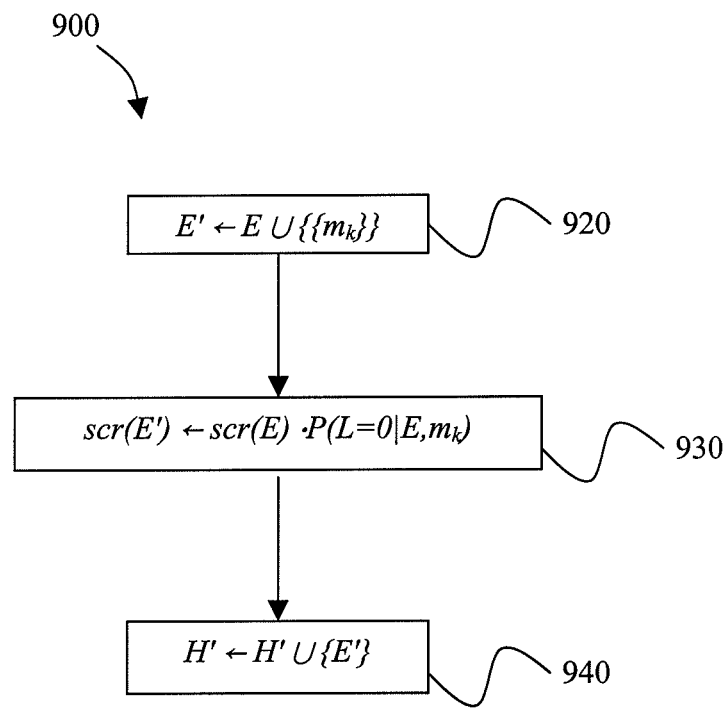
FIG. 9 is a flow diagram illustrating an exemplary "Start a new entity with $m_k$ and add to the entities in E" Block in accordance with FIG. 8.

FIG. 9 depicts a flow diagram of the preferred embodiment of extending an existing result E, by starting a new entity with a selected mention $m_k$, indicated generally by the reference numeral 900. Block 920 starts a new partial entity with the selected mention $m_k$, and associates it with the partial entities that already make up E. It then stores this new result in a temporary storage device E'. Block 930 calculates a new score for the new result by taking the score of the original result and multiplying it by the probability of starting a new entity; thus, the scores are cumulative. In Block 840 the new result is added to the results already stored in H'.

Figure 10:
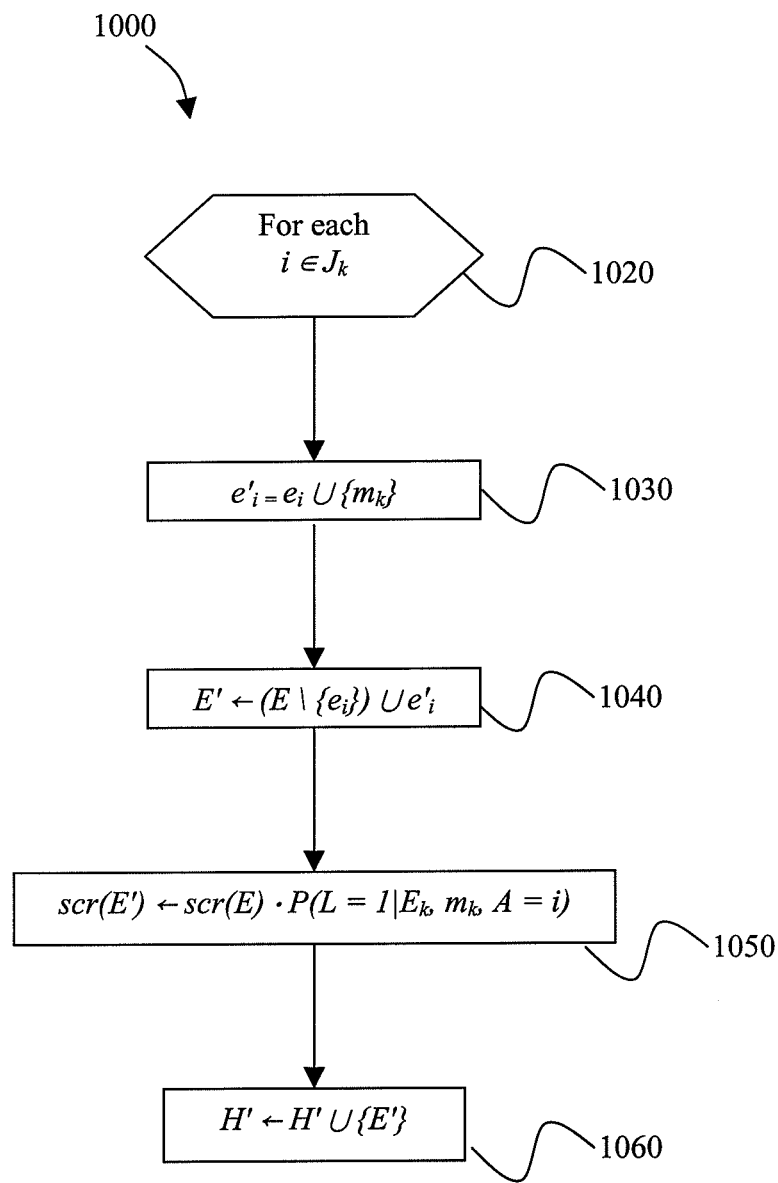
FIG. 10 is a flow diagram illustrating an exemplary "Link mention $m_k$ with the entities in E" block in FIG. 8.

FIG. 10 depicts a flow diagram of the preferred embodiment of extending a selected result E, by linking a selected mention $m_k$ to it, indicated generally by the reference numeral 1000. A looping Block 1020 executes a loop, for each partial entity that makes up result E, selecting each partial entity one at a time. Block 1030 creates a new partial entity $e'_i$, by linking the selected mention $m_k$, to the selected partial entity $e_i$. Block 1040 replaces the selected partial entity $e_i$, with the new partial entity $e'_i$, creating a new result E'. Block 1050 calculates a score to associate with the new result E', by multiplying the score of the original result E with the linking probability; thus, the scores are cumulative. In Block 1060 the new result E' is added to the results already stored in H'. This process is repeated for all the entities that make up the selected result E, creating a brand new result with each iteration.

Embodiments of the disclosure have many uses. One exemplary use is in Question and Answering (Q&A) system. A Q&A system is a computer system that has access to a large number of text documents, and can answer a user's question, based on the information contained within the documents. For example, a person might ask, "who visited China in 1972?" The text documents stored in the system could include the following text:

"In 1968, Richard Nixon again won his party's nomination, and went on to defeat Vice President Hubert H. Humphrey and third-party candidate George C. Wallace. Some of his most acclaimed achievements came in his quest for world stability. During visits in 1972 to Beijing and Moscow, he reduced tensions with China and the U.S.S.R."

In order to answer the question, the Q&A system has to figure out the pronoun "he", in the last sentence of the example text, refers to "Richard Nixon." Analogous art coreference systems, which output only one result, may very well link "he" with "Hubert H. Humphrey" or "George C. Wallace" because of their proximity to the word "he" within the sample text. According to an exemplary embodiment of the present invention, which can generate more than one output, it is more likely to produce a set of results that contain the correct answer. The Q&A system will then have a chance of selecting a preferable answer, from this set of likely possibilities.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

It should also be understood that the above description is only representative of illustrative embodiments. For the convenience of the reader, the above description has focused on a representative sample of possible embodiments, that are illustrative of the principles of the invention, and has not attempted to exhaustively enumerate all possible variations. That alternative embodiments may not have been presented for a specific portion of the invention is not to be considered a disclaimer of those alternate embodiments. Other applications and embodiments can be straightforwardly implemented without departing from the spirit and scope of the present invention. It is therefore intended, that the invention not be limited to the specifically described embodiments, but the invention is to be defined in accordance with that claims that follow. It can be appreciated that many of those undescribed embodiments are within the literal scope of the following claims, and that others are equivalent.

What is claimed is:

1. A data storage device readable by a machine embodying instructions executable by a processor to perform a method for entity tracking, comprising:
   inputting a document comprising references to a plurality of objects;
   creating a data structure based on the document comprising a tree structure comprising nodes corresponding to different entity outcomes, wherein each entity is a collection of mentions that refer to a same object, the nodes having respective scores indicative of respective different entity outcomes, wherein each mention is all instance of a reference to one of the plurality of objects within the document and chaining the plurality of mentions includes linking the mentions together as either part of a same entity or different entities; and
   searching the tree structure for at least one of the nodes in response to an entity tracking query, wherein searching comprises selecting the at least one of the nodes having a score greater than a threshold as a response to the entity tracking query, wherein a selected node indicates at least one of the plurality of objects,
   each node having at least one partial entity and representing a unique result;
   wherein the created data structure includes probability information representing the combined probability of:
   a first mention of the plurality of mentions is part of a same entity as a second mention of the plurality of mentions;
   a third mention of the plurality of mentions is part of the same entity as the first and second mentions, given that the first mention and the second mention are part of the same entity;
   the third mention is part of the same entity as the first mention but not the second mention, given that the first mention is not part of the same entity as the second mention; and
   the third mention is part of the same entity as the second mention but not the first mention, given that the first mention is not part of the same entity as the second mention.

2. The data storage device as defined in claim 1, wherein:
   the tree structure is a Bell Tree structure comprising:
   a plurality of layers, each layer being associated with a different mention to be chained;
   each layer of said plurality of layers having at least one node.

3. The data storage device as defined in claim 2 wherein:
   the plurality of layers has a root layer and a remainder of layers;
   the mention associated with the root layer is a first mention;
   the root layer includes a single node; and
   said single node, representing a first result, includes a partial entity resultant from said first mention.

4. The data storage device as defined in claim 3 wherein:
   said nodes of each of the remainder of layers link the associated mention of a respective layer to each partial entity in any preceding node creating a new partial entity with the associated mention and associating the new partial entity with each result represented in the preceding set of nodes,
   whereby all results that are possible when said associated mention is added to the Bell Tree are represented.

5. The data storage device as defined in claim 2 wherein:
   the plurality of layers has a last leaf layer;
   said last leaf layer representing all possible results from chaining the plurality of mentions.

6. The data storage device as defined in claim 3 wherein each node representing each different possible result has an associated score.

7. The data storage device as defined in claim 4 wherein each node representing each different possible result has an associated score.

8. The data storage device as defined in claim 5 wherein each leaf representing each different possible result has an associated score.

9. A data storage device readable by a machine embodying instructions executable by a processor to perform a method for entity tracking, comprising:
   inputting a document comprising references to a plurality of objects;
   creating a tree structure based on the document comprising a plurality of layers, each layers corresponding to a different mentions mention of a plurality of mentions, and wherein the different mentions are chained to one another, wherein leaf nodes of the tree structure correspond to different entity outcomes wherein each entity is a collection of mentions of the plurality of mentions that refer to a same object; and
   searching the tree structure for at least one of the nodes in response to an entity tracking query, wherein searching comprises selecting the at least one of the nodes having a score greater than a threshold as a response to the entity tracking query,
   each node having at least one partial entity and representing a unique result;
   wherein the tree structure includes probability information representing the combined probability of:
   a first mention of the plurality of mentions is part of a same entity as a second mention of the plurality of mentions;
   a third mention of the plurality of mentions is part of the same entity as the first and second mentions, given that the first mention and the second mention are part of the same entity;

the third mention is part of the same entity as the first mention but not the second mention, given that the first mention is not part of the same entity as the second mention; and the third mention is part of the same entity as the second mention but not the first mention, given that the first mention is not part of the same entity as the second mention.

10. The data storage device as defined in claim 9, wherein the tree structure is a Bell Tree structure comprising the plurality of layers, each layer of said plurality of layers having at least one node.

11. The data storage device as defined in claim 10 wherein:
the plurality of layers has a root layer and a remainder of layers;
the mention associated with the root layer is a first mention;
the root layer includes a single node; and
said single node, representing a first result, includes a partial entity resultant from said first mention.

12. The data storage device as defined in claim 11 wherein:
said nodes of each of the remainder of layers link the associated mention of a respective layer to each partial entity in any preceding node creating a new partial entity with the associated mention and associating the new partial entity with each result represented in the preceding set of nodes,
whereby all results that are possible when said associated mention is added to the Bell Tree are represented.

13. The data storage device as defined in claim 10 wherein:
the plurality of layers has a last leaf layer;
said last leaf layer representing all possible results from chaining the plurality of mentions.

14. The data storage device as defined in claim 11 wherein each node representing each different possible result has an associated score.

15. The data storage device as defined in claim 12 wherein each node representing each different possible result has an associated score.

16. The data storage device as defined in claim 13 wherein each leaf representing each different possible result has an associated score.

* * * * *